United States Patent [19]

Goodall

[11] Patent Number: 4,923,939
[45] Date of Patent: May 8, 1990

[54] RING OPENING POLYMERIZATION WITH ORGANOPHOSPHONIUM AND ORGANOARSONIUM METATHESIS CATALYSTS

[75] Inventor: Brian L. Goodall, Akron, Ohio

[73] Assignee: The B.F. Goodrich Company, Akron, Ohio

[21] Appl. No.: 312,151

[22] Filed: Feb. 21, 1989

[51] Int. Cl.$^5$ .............................................. C08F 4/78
[52] U.S. Cl. ................................... 526/161; 526/114; 526/119; 526/169; 526/137; 526/144; 526/281; 526/282; 526/283; 264/328.6
[58] Field of Search ............... 526/114, 119, 169, 172, 526/283, 161, 137, 144; 264/328.6

[56] References Cited

U.S. PATENT DOCUMENTS 4,380,617 4/1983 Miachak et al. ............... 526/283 X

*Primary Examiner*—Joseph L. Schofer
*Assistant Examiner*—F. M. Teskin
*Attorney, Agent, or Firm*—George A. Kap; Nestor W. Shust

[57] ABSTRACT

This invention pertains to the use of organophosphonium and organoarsonium molybdates and tungstates as catalysts in a metathesis catalyst system in polymerization of cycloolefin monomers by ring opening polymerization. Polymerization can be by reaction injection molding in absence of a solvent whereby a thermoset polymer is produced or by solution polymerization in presence of a suitable solvent whereby a thermosetting or a thermoplastic polymer is produced. The cycloolefin monomers are polycycloolefins containing at least one norbornene group, and mixtures thereof.

18 Claims, No Drawings

RING OPENING POLYMERIZATION WITH ORGANOPHOSPHONIUM AND ORGANOARSONIUM METATHESIS CATALYSTS

BACKGROUND OF THE INVENTION

Preparation of norbornene-type monomers is well known. Dicyclopentadiene can be made by dimerizing cyclopentadiene by the Diels-Alder reaction whereas dihydrodicyclopentadiene can be made by the Diels-Alder reaction of cyclopentadiene and cyclopentene. Norbornenes can also be prepared by the Diels-Alder reaction of cyclopentadiene with selected olefins to yield either norbornene or substituted norbornenes. Tetracyclododecene compounds are by-products formed from the Diels-Alder reaction of cyclopentadiene and norbornenes. Symmetrical and unsymmetrical trimers and tetramers of cyclopentadiene can likewise be prepared by the Diels-Alder reaction of cyclopentadiene or by heat-treating dicyclopentadiene.

Polymerization of norbornene-type monomers is performed by ring opening polymerization by means of a metathesis catalyst system which system includes a metathesis catalyst and a metathesis cocatalyst. The catalyst is generally selected from molybdenum, tungsten, and tantalum compounds whereas the cocatalyst is selected from organometallic compounds such as alkylaluminums and alkylaluminum halides.

U.S. Pat. No. 4,400,340 to Klosiewicz describes a tungsten-containing catalyst such as tungsten halide or tungsten oxyhalide. The catalyst is suspended in a solvent to prevent it from prepolymerizing a monomer to which is added an alcoholic or a phenolic compound to facilitate solubilization of the tungsten catalyst in the monomer and a Lewis base or a chelant to prevent premature polymerization of the solution of the tungsten compound and the monomer. Amount of the tungsten compound is 0.1 to 0.7 mole per liter of solvent. Weight ratio of the tungsten compound to the alcoholic or phenolic compound is 1:1 to 1:3, and amount of the Lewis base or chelant is 1 to 5 moles thereof per mole of the tungsten compound. Treatment of the tungsten compound should be carried out in the absence of moisture and air to prevent deactivation of the tungsten compound catalyst. The catalyst must be treated in the manner outlined above in order to render it soluble in the cycloolefin monomer. The cocatalyst in this patent is disclosed as being selected from tetrabutyltin and alkylaluminum compounds such as alkylaluminum dihalide or dialkylaluminum halide where the alkyl group contains 1 to 10 carbon atoms. The preferred alkyl group is ethyl with diethylaluminum chloride being the most preferred cocatalyst. These cocatalysts are sensitive to air and moisture but are readily soluble in the cycloolefin monomers.

U.S. Pat. No. 4,380,617 to Minchak et al discloses metathesis catalyst systems for polymerizing cycloolefins. The catalysts are defined as organoammonium isopolymolybdates and organoammonium isopolytungstates and these catalysts are soluble in cycloolefins and are insensitive to air and moisture. The cocatalysts in this patent are similar to the cocatalysts disclosed in U.S. Pat. No. 4,400,340 and are generally selected from organometallics, particularly alkylaluminum halides although in a less preferred embodiment, other metals can be used in place of aluminum such as lithium, magnesium, boron, lead, zinc, tin, silicon, and germanium. Also, metallic hydrides can be used in whole or in part for the organometallic cocatalysts. Alkylaluminum and the corresponding organometallic compounds can also be used as cocatalysts herein.

U.S. Pat. No. 4,426,502 discloses the use of alkoxyalkylaluminum halides or aryloxyalkylaluminum halides as cocatalysts in metathesis catalyst systems to polymerize cycloolefin monomers. These cocatalysts are disclosed as especially useful in conjunction with organoammonium isopolytungstate and isopolymolybdate catalysts in polymerization of cycloolefins or norbornene-type monomers. By modifying the alkylaluminum halide cocatalysts to alkoxy or aryloxy alkylaluminum halides, the reducing power of the cocatalysts is thus lowered to provide adequate pot life for mixing various ingredients at room temperature, and for work interruptions, before initiation of polymerization and subsequent rapid polymerization.

SUMMARY

Polymerization of cycloolefins by ring opening is accomplished in the presence of a metathesis catalyst system composed of a metathesis catalyst and a metathesis cocatalyst wherein the catalyst is selected from organophosphonium molybdates and tungstates and organoarsonium molybdates and tungstates, and mixtures thereof.

DETAILED DESCRIPTION OF THE INVENTION

This invention resides in the use of organophosphonium and/or organoarsonium molybdates and tungstates in ring opening polymerization of cycloolefins containing a norbornene group. These catalysts are wholly or partially soluble in hydrocarbon solvents and in the cycloolefin monomers, and are insensitive to oxygen and moisture. Metathesis cocatalysts, particularly those selected from alkoxyalkylaluminum halides, together with other ingredients, can be used in conjunction with the metathesis catalysts described herein, can be used to polymerize cycloolefins containing at least one norbornene group by solution or by bulk polymerization. The polymeric product contains pendant unsaturation.

Suitable organophosphonium and organoarsonium molybdate and tungstate catalysts are defined by the following formulas:

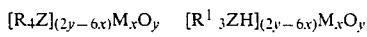

$$[R_4Z]_{(2y-6x)}M_xO_y \quad [R^1{}_3ZH]_{(2y-6x)}M_xO_y$$

where Z represents phosphorus or arsenic; O represents oxygen; M represents either molybdenum or tungsten, X and Y represent the number of M and O atoms in the molecule based on the valence of +6 for molybdenum, +6 for tungsten and −2 for oxygen; and the R and $R^1$ radicals can be same or different and are selected from hydrogen, alkyl and alkylene groups each containing from 1 to 20 carbon atoms, and cycloaliphatic groups each containing from 5 to 16 carbon atoms. All of the R and $R^1$ radicals cannot be hydrogens or be small in the number of carbon atoms since such a condition will render the molecule essentially insoluble in hydrocarbons and most organic solvents or in cycloolefins containing at least one norbornene group. In a preferred embodiment, the R radicals are selected from alkyl groups each containing 1 to 18 carbon atoms wherein the sum of carbon atoms on all the R radicals is from 20 to 72, more preferably from 25 to 48. In a preferred embodiment, the $R^1$ radicals are selected from alkyl groups each containing from 1 to 18 carbon atoms wherein the sum of carbon atoms on all of the $R^1$ radicals is from 15 to 54, more preferably from 21 to 42.

It has been found that in the case of the molybdate and tungstate catalysts of the present invention represented by the formula:

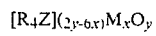
$$[R_4Z]_{(2y-6x)}M_xO_y$$

where all R radicals are the same, each can contain from 4 to 18 carbon atoms. Where three R radicals are the same, each containing from 7 to 18 carbon atoms, the remaining R can contain from 1 to 18 carbon atoms. Where three R radicals are the same, each containing 4 to 6 carbon atoms the remaining R radical can contain 4 to 18 carbon atoms. In the case where two of the four R radicals are the same, the two same R radicals can each contain from 12 to 18 carbon atoms and the remaining two R radicals can contain from 1 to 18 carbon atoms. With respect to each other, the remaining two R radicals can be same or different as long as each contains 1 to 18 carbon atoms. Where all R radicals are different, the sum thereof can be in the range of 20 to 72 carbon atoms.

Similar remarks apply to the molybdate and tungstate catalysts that are defined by the following formula:

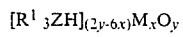
$$[R^1{}_3ZH]_{(2y-6x)}M_xO_y$$

The $R^1$ radicals cannot be too small if the molecule is to be soluble in a hydrocarbon reaction solvent and/or a norbornene-type monomer. Where all $R^1$ radicals are the same in the above formula, each can contain from 5 to 18 carbon atoms. Where two $R^1$ radicals are the same or all the $R^1$ radicals are different, each can contain from 1 to 18 carbon atoms and the sum thereof can be in the range of 15 to 72 carbon atoms. Included herein are also compounds wherein one $R^1$ radical is hydrogen in which case, the remaining two $R^1$ radicals can each contain 12 carbon atoms and greater, i.e., 12 to 18 carbon atoms.

Specific examples of suitable organophosphonium and organoarsonium molybdates and tungstates described herein include tridodecylphosphonium molybdates and tungstates, methyltricaprylphosphonium molybdates and tungstates, tri(tridecyl)phosphonium molybdates and tungstates, and trioctylphosphonium and trioctylarsonium molybdates and tungstates.

The organophosphonium and organoarsonium molybdate and tungstate catalysts described herein are used with a suitable metathesis ring opening polymerization cocatalyst to polymerize cycloolefins containing at least one norbornene group. The cocatalysts include alkylaluminums and alkylaluminum halides and especially alkoxyaluminum and aryloxyalkylaluminum compounds defined by the following formula:

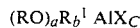
$$(RO)_aR_b{}^1 AlX_C$$

where R is an alkyl or a phenyl radical containing about 1 to 18 carbon atoms, preferably 2 to 4; $R^1$ is an alkyl radical containing 1 to 18 carbon atoms, preferably 2 to 4; X is a halogen selected from chlorine, iodine, bromine and fluorine, preferably chlorine and iodine; "a" is the number of equivalents of the alkoxy or aryloxy moiety (RO—) and can vary from a minimum of about ½ to a maximum of about 2 ½, preferably from about 1 to about 1 ¾; "b" is the number of equivalents of the alkyl group ($R^1$) and can vary from a minimum of about ¼ to to a maximum of about 2, preferably from about ½ to about 1; and "c" is the number of equivalents of halogen X and can vary from a minimum of 0 to a maximum of about 2, preferably from about ¾ to about 1 ¼. The sum of a, b, and c must equal 3.0. From the definition of the parameter "c", it should be apparent that halogen-free cocatalyst are contemplated herein for the cocatalysts wherein "c" equals zero.

Also suitable as cocatalyst herein are the aryloxyalkylaluminum halides, as noted above. The aryloxy group is preferably derived from unhindered phenols and substituted and unsubstituted resorcinols. Especially preferred aryloxy group is the phenoxy group derived from a phenol that is unhindered at 2 and 6 positions. Specific examples of such compounds are phenol itself and derivatives of unsubstituted resorcinol where one of the two hydroxyl groups is esterified, as to a benzoate. These cocatalysts generally function in the same manner as the alkoxyalkylaluminum halide cocatalysts.

Preferred cocatalysts noted herein include the alkoxyalkylaluminum chlorides and iodides derived from diethylaluminum chloride, monoethylaluminum dichloride, ethyl aluminum sesquichloride, propylaluminum dichloride, isobutylaluminum dichloride, methylaluminum sesquichloride, diethylaluminum iodide, ethyl aluminum diiodide, and propylaluminum diiodide.

Although aluminum is the preferred reducing agent in the alkylaluminum halide cocatalysts, other organometallic halide reducing agents can function as well. Metals that form suitable organometallic cocatalysts include lithium, magnesium, boron, lead, zinc, tin, silicon and germanium. Also, the metallic hydrides can be substituted in whole or in part for the organometallic cocatalysts.

The molybdate or tungstate cocatalysts, or a mixture thereof, is employed at a level of 0.01 to 50 millimoles of molybdenum or tungsten and the heteropoly atoms(s) per mole of total monomer, preferably 0.1 to 10 millimoles. The molar ratio of the alkylaluminum halide to the molybdate and/or tungstate catalyst is not critical and can range from about 200:1 or more to 1:10, preferably 50:1 to 2:1 of aluminum to molybdenum or tungsten.

The norbornene-type monomers or the cycloolefins that can be polymerized in accordance with the process described herein are characterized by the presence of the norbornene group, defined structurally by the following formula I:

(I)

Pursuant to this definition, suitable norbornene-type monomers include substituted and unsubstituted norbornenes, dicyclopentadienes, dihydrodicyclopentadienes, trimers of cyclopentadiene, and tetracyclododecenes. Preferred monomers of the norbornene-type are those defined by the following formulas II and III:

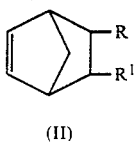 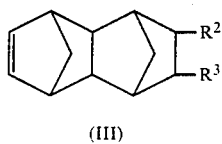

(II)    (III)

where R and R¹ are independently selected from hydrogen, alkyl groups of 1 to 20 carbon atoms, and saturated and unsaturated hydrocarbon cyclic groups formed by R and R¹ together with the two ring carbon atoms connected thereto containing 4 to 7 carbon atoms. In a preferred embodiment, R and R¹ are independently selected from hydrogen, alkyl groups of 1 to 3 carbon atoms, and monounsaturated hydrocarbon cyclic groups containing 5 carbon atoms, the cyclic group being formed by R and R¹ as well as by the two carbon atoms connected to R and R¹. In reference to formula III, R² and R³ are independently selected from hydrogen and alkyl groups containing 1 to 20 carbon atoms, preferably 1 to 3 carbon atoms.

Examples of monomers referred to herein include dicyclopentadiene, methyltetracyclododecene; 2-norbornene and other norbornene monomers such as 5-ethylidene-2-norbornene, 5-vinyl-2-norbornene, 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, and 5-dodecyl-2-norbornene.

The monomer or mixture of norbornene-type monomers can contain up to about 20% by weight thereof of at least one other polymerizable monomer. Such other polymerizable monomers are preferably selected from mono-and dicycloolefins containing 4 to 12 carbon atoms, preferably 4 to 8 carbon atoms, examples of which include cyclobutene, cyclopentene, cyclopentadiene, cycloheptene, cyclooctene, 1,5-cyclooctadiene, cyclodecene, cyclododecene, cyclododecadiene, and cyclododecatriene. Also suitable are bicyclic olefins containing 7 to 16 carbon atoms and 1 to 4 double bonds, preferably 8 to 12 carbon atoms and 2 to 3 double bonds, such as norbornadiene. As should be apparent, cycloolefins that cannot be polymerized by ring opening, i.e., cyclohexene and derivatives thereof, are not employed in the polymerization process of this invention except as solvents.

In solution polymerization, a hydrocarbon reaction solvent is mixed with a cycloolefin monomer or a mixture thereof, with or without other polymerizable monomers and the mixture of the monomer and solvent is charged into a reactor. A molecular weight modifier selected from nonconjugated acyclic olefins is then charged into a reactor followed by at least one organometallic or alkylaluminum halide cocatalyst and at least one molybdate or tungstate catalyst that is soluble in the monomer. The reaction can be conducted at 0 to 100° C., preferably 20° to 80° C., or at ambient temperature and carried out to completion in less than two hours. The reaction can be shortstopped by addition of an alcohol. The resulting product is a smooth, viscous polymer cement. Upon removal of the solvent, the polymer is a thermoplastic, solid material.

Solution polymerization requires presence of a solvent. Suitable solvents for solution polymerization include aliphatic and cycloaliphatic hydrocarbon solvents containing 4 to 10 carbon atoms such as pentane, hexane, heptane, octane, cyclohexane, cyclohexene, cyclooctene and the like; aromatic hydrocarbon solvents containing 6 to 14 carbon atoms which are liquid or easily liquified such as benzene, toluene, naphthalene and the like; and substituted hydrocarbons wherein the substituents are inert, such as dichloromethane, chloroform, chlorobenzene, dichlorobenzene, and the like. Cyclohexane was found to be an excellent solvent. The polymer need not be soluble in the solvent. The solvent may be added at any point in the charging procedure, but a portion, preferably 0 1 to 10% of the total solvent, is used to dissolve the catalyst and the remainder added before the catalyst solution. Generally, ½ to 2 liters of solvent is used per 100 grams of monomer.

A solution polymerization activator may be used but is not generally needed. Examples of activators include water, methanol, ethanol, isopropyl alcohol, benzyl alcohol, phenol, ethyl mercaptan, 2-chloroethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. Excellent activation is obtained by using air or a peroxide or hydroperoxide as the activator, especially by using the organic peroxides such as benzoyl peroxide. The activator may be employed in a range from about 0 moles to about 3 moles per mole of the cocatalyst, more preferably from about 0 to about 1 mole per mole. The activator may be added at any point in the charge procedure but it is more preferably added last, or with the catalyst.

At least one nonconjugated acyclic olefin can be used as a molecular weight modifier having at least one hydrogen on each double-bonded carbon atom and containing 2 to 12 carbon atoms, more preferably 3 to 8 carbon atoms. Inert substituents on the remaining carbon atoms are selected from the group consisting of hydrogens and alkyl groups containing 1 to 8 carbon atoms. Examples of suitable acyclic olefins include 1-olefins such as 1-butene, 3-methyl-1-butene, and the like; 2-olefins; 3-olefins; and nonconjugated triolefins. More preferably, the nonconjugated acyclic olefin is selected from the group consisting of 1-olefins and 2-olefins containing 3 to 8 carbon atoms such as 1-butene, 3-methyl-1-butene, 2-pentene, 4-methyl-2-pentene, and the like. Compounds not having hydrogen atoms substituted on double-bonded carbons are unreactive in this invention.

The nonconjugated acyclic olefin can be used in a molar ratio to total monomer charge of from about 0.0001 to about 1 mole per mole of the monomer charge. The nonconjugated acyclic olefin can be charged directly or in solution at any point in the charge procedure, but it is more preferably charged along with the monomers. When charged last, the nonconjugated acyclic olefin is preferably charged before reaction begins.

The monomers can be added at any point in the charging procedure. Normally, however, the monomers, solvent and nonconjugated acyclic olefin are added first to the reactor vessel. These ingredients can be added separately or as a mixture of ingredients. Next, the cocatalyst and the catalyst are added separately, usually in the hydrocarbon solvent described above. The metallate catalyst component is added following addition of the cocatalyst component although the order can be reversed. Completion of the polymerization reaction is indicated by the disappearance of the monomer in the charge, as monitored by gas chromatography.

Bulk polymerization is carried out in absence of a solvent by polymerizing cycloolefin monomer or a mixture thereof by means of a metathesis catalyst system wherein the catalyst component is a molybdate or tungstate of this invention. The monomer can be formed into a hard object in a single step by means of reaction injection molding (RIM) process wherein polymerization takes place in a mold. Examples of such objects include business machine housings, furniture, window frames, automobile and recreation vehicle parts, and the like.

Since the catalysts described herein are soluble in a norbornene-type monomer or a mixture thereof, the polymerization can be carried out in absence of a solvent and other additives used in solution polymerization. The cocatalysts are also soluble in such monomers. This, of course, facilitates polymerization in bulk and makes it possible to polymerize the norbornene-type monomer(s) by reaction injection molding process.

In bulk polymerization such as reaction injection molding process, conversion of in excess of 95%, preferably in excess of 98% can be attained, measured by the thermal gravimetric procedure, in the presence of a halogen source.

If the cocatalyst does not contain any halide or if more halogen is desired, then a halogen source is used. Halogen source such as halosilanes are used in amount of 0.05 to 10 millimoles per mole of the cycloolefin monomer, preferably 0.1 to 2 millimoles per mole of the monomer. Specific examples of preferred halogen source are chlorosilanes such as dimethylmonochlorosilane, dimethyldichlorosilane, diphenyldichlorosilane, tetrachlorosilane, and the like.

In order to further illustrate the invention described herein, the following examples are presented that demonstrate certain aspects of the invention herein in greater detail. It is to be understood, however, that the examples are presented for illustrative purposes and not in any sense are to limit the scope of the invention herein, the scope of which is defined by the appended claims.

EXAMPLE 1

This example demonstrates preparation of a phosphonium molybdate catalyst in the manner demonstrated by the following formula:

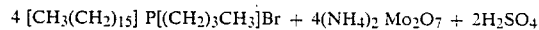

The ammonium dimolybdate (13.6 g, 0.04 mole) was dissolved in deionized water (150 ml). The hexadecyl-tri-n-butyl-phosphonium bromide (20.3 g, 0.04 mole) was dissolved in deionized water (100 ml) and concentrated sulfuric acid (2.0 ml) was added. The resulting phosphonium bromide/acid solution was added to the molybdate solution with stirring.

To the resulting mixture was added methylene chloride (200 ml) followed by refluxing for 60 minutes. The methylene chloride layer (green in color) was separated off and washed three times with 100 ml deionized water, followed by drying over magnesium sulfate. The solvent was stripped off on a rotovapor at 50° C. and the drying was completed in a vacuum oven at 90° C. to yield the product as a dark green solid.

The product was characterized by infra-red (IR) analysis showing characteristic IR stretching frequencies in the region 1000 to 600 cm$^{-1}$, which is characteristic of the $Mo_8 O_{26}$ anion, and by phosphorus NMR where, after proton decoupling, a sharp singlet was seen at 33.7 ppm relative to an external 85% $H_3PO_4$ sample, used as a reference, and by proton NMR where was observed a broad singlet at 2.3 ppm with 8 protons and a complex pattern of signals in the range 1.5 to 0.9 ppm with 52 protons relative to tetramethyl silane.

EXAMPLE 2

This example demonstrates preparation of the phosphonium tungstate in the manner demonstrated by the following formula:

Pursuant to the procedure, dissolved sodium tungstate in 150 mls of deionized water in a 1000 ml round bottom flask to form solution A which was clear. Then, separately dissolved the bromide in 100 ml of deionized water and added thereto sulfuric acid, to form solution B, which was a cloudy white emulsion. Added with stirring solution B to solution A forming a two-layer cloudy white mixture C. Added 75 mls of methylene chloride to mixture C. The colorless methylene chloride layer was separated and washed twice with 100 mls of deionized water, followed by drying over magnesium sulfate. The solvent was then stripped off on a rotovapor at 50° C. and the solid was dried in a vacuum oven at 90° C. to yield the light blue solid catalyst product.

The product was characterized by infra-red spectroscopy. The IR stretching frequencies associated with the $(W_6O_{19})^{-2}$ ion were found to be virtually identical to that of an organoammonium tungstate known to contain the same tungstate ion.

EXAMPLE 3

This example demonstrates polymerization of 92.5/7.5 weight percent monomer mixture of dicyclopentadiene (DCPD) and ethylenenorbornadiene (ENB) using the phosphonium molybdate catalyst of Example 1 and the phosphonium tungstate catalyst of Example 2 with diethylaluminum (DEAC) cocatalyst and silicon tetrachloride (SiCl$_4$). The solutions of the materials were in the DCPD/ENB monomer mixtures. The formulations A and B were prepared on the basis of the following:

|  | Formulations | |
| --- | --- | --- |
|  | A | B |
| Catalyst of Ex. 1 | 0.1 g (0.0311 mmol) | — |
| Catalyst of Ex. 2 | — | 0.1 g (0.0413 mmol) |
| DCPD/ENB (92.5/7.5) | 40 g (0.303 mol) | 40 g (0.303 mol) |
| SiCl$_4$ 0.25 M | 2.0 mls (0.50 mmol) | 2.0 mls (0.50 mmol) |

-continued

| | Formulations | |
|---|---|---|
| | A | B |
| DEAC 0.50 M | 2.0 mls (1.0 mmol) | 2.0 mls (1.0 mmol) |

Pursuant to the procedure, the indicated amount of the catalyst was placed in a clean, dry sample bottle which was then purged with nitrogen for one hour and the monomer mixture was added. The bottle was stoppered and allowed to sit for several hours to dissolve the catalyst. Then, silicon tetrachloride and the DEAC cocatalyst were added to the bottle under nitrogen and the bottle was restoppered. After several minutes, the bottle was placed in an oven to further conversion.

With respect to formulation A, the monomer/catalyst mixture formed a light green emulsion. Upon addition of silicon tetrachloride, the solution turned light tan in color. Upon addition of the DEAC cocatalyst, the solution turned dark brown with an immediate but slow viscosity increase. A grainy mass formed and after ten minutes, the bottle was placed in an oven at 140° C. to further facilitate the reaction. The solid polymer produced was dark brown in color.

With respect to formulation B, the monomer/catalyst mixture formed a colorless emulsion. Upon addition of the DEAC cocatalyst, the solution immediately turned green then dark green with slow viscosity increase. After five minutes, the bottle was placed in the 140° C. oven and removed in another five minutes. The bottle contents solidified into an olive drab/light tan polymer mass.

We claim:

1. Process for preparing a polymer by ring opening polymerization in the presence of a metathesis catalyst system, said process comprising the steps of polymerizing a cycloolefin monomer containing a norbornene group, or a mixture thereof, in the presence of an effective amount of a metathesis catalyst component and an effective amount of a metathesis cocatalyst component; said catalyst component is selected from organophosphonium molybdates and tungstates, organoarsonium molybdates and tungstates, and mixtures thereof and is wholly or partially soluble or forms an emulsion in said monomer or mixture thereof.

2. Process of claim 1 wherein said cycloolefin monomer is characterized by the presence of a norbornene group defined as follows:

and said cocatalyst component is selected from organometallic compounds, organometallic halide compounds, and mixtures thereof.

3. Process of claim 2 wherein said cocatalyst is selected from alkylaluminum, alkylaluminum halides, and mixtures thereof.

4. Process of claim 2 wherein said cocatalyst is selected from alkoxyalkylaluminum compounds, aryloxyalkylaluminum compounds, and mixtures thereof; and said catalyst is selected from the catalysts and mixtures thereof defined as follows:

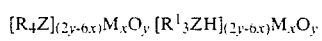

where Z is phosphorus, arsenic, and mixtures thereof; M is molybdenum, tungsten, and mixtures thereof; x and y represent the number of M and O atoms in the molecule based on the valence of +6 for molybdenum +6 for tungsten, and −2 for oxygen; and R and $R^1$ groups can be same or different and are selected from hydrogen, alkyl and alkylene groups each containing 1 to 20 carbon atoms, and cycloaliphatic groups containing 5 to 16 carbon atoms; the sum of all carbon atoms in R and $R^1$ groups is such that said catalyst is soluble in organic solvents and in said cycloolefin monomers.

5. Process of claim 4 wherein in said catalyst, R groups are selected from alkyl groups each containing 1 to 18 carbon atoms wherein the sum of all carbon atoms in all R groups is 20 to 72; and $R^1$ groups are selected from alkyl groups each containing 1 to 18 carbon atoms wherein the sum of all carbon atoms in all $R^1$ groups is 15 to 54.

6. Process of claim 5 wherein said cocatalyst is selected from compounds defined by the following formula:

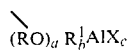

where R in said cocatalyst is selected from alkyl and aryl groups containing 1 to 18 carbon atoms; $R^1$ in said cocatalyst is an alkyl group of 1 to 18 carbon atoms; X in said cocatalyst is a halogen; and (a), (b) and (c) in said cocatalyst represent equivalents of RO, $R^1$ and X, respectively, where (a) is about $\frac{1}{2}$ to $2\frac{1}{2}$, (b) is about $\frac{1}{4}$ to 2, and (c) is about 0 to 2 and where the sum of (a), (b) and (c) is 3.

7. Process of claim 6 wherein in reference to said cocatalyst, the R group is selected from alkyl groups of 2 to 4 carbon atoms, $R^1$ group also contains 2 to 4 carbon atoms, (a) is 1 to 1 $\frac{3}{4}$, (b) is $\frac{1}{2}$ to 1, and (c) is $\frac{3}{4}$ to 1 $\frac{1}{4}$.

8. Process of claim 5 wherein said monomer containing a norbornene group is selected from substituted and unsubstituted norbornenes, dicyclopentadiene, ethylidene norbornene, dihydrodicyclopentadiene, trimers of cyclopentadiene, tetramers of cyclopentadiene, tetracyclododecene, and mixtures thereof.

9. Process of claim 5 wherein said monomer containing a norbornene group is selected from norbornene, alkyl norbornenes containing 1 to 3 carbon atoms in the alkyl group(s), ethylidene norbornene, vinyl norbornene, trimers of cyclopentadiene, tetramers of cyclopentadiene, tetracyclododecene, alkyl tetracyclododecenes containing 1 to 3 carbon atoms in the alkyl group(s), and mixtures thereof.

10. Process of claim 6 wherein amount of said catalyst is 0.01 to 50 millimoles of molybdenum or tungsten per mole of said monomer(s) and molar ratio of said cocatalyst component to said catalyst component is in the range of 200:1 to 1:10 of aluminum to molybdenum or tungsten.

11. Process of claim 8 wherein said catalyst is used at a level of 0.1 to 10 millimoles based on the weight of molybdenum or tungsten; and wherein molar ratio of said cocatalyst to said catalyst is in the range of about 50:1 to 2:1.

12. Process of claim 11 which also includes the step of adding a halogen source in amount of 0.1 to 2 millimoles per mol of said monomer(s), said halogen source is selected from chlorosilanes.

13. Process of claim 12 wherein said halogen source is selected from dimethylmonochlorosilane, dimethyldichlorosilane, diphenyldichlorosilane, tetrachlorosilane, and mixtures thereof.

14. Process of claim 13 which includes the step of mixing multiple streams containing said catalyst, said cocatalyst, said halogen source, and said monomer(s) to produce a reactive mixture, and the step of injecting said reactive mixture into a mold where said polymerization takes place to produce a thermoset polymer.

15. Process of claim 14 wherein conversion of said polymer is at least 95%, measured by thermal gravimetric procedure.

16. Process of claim 10 which also includes the step of adding a halogen source in amount of 0.1 to 2 millimoles per mol of said monomer(s), said halogen source is selected from chlorosilanes.

17. Process of claim 16 wherein said halogen source is selected from dimethylmonochlorosilane, dimethyldichlorosilane, diphenyldichlorosilane, tetrachlorosilane, and mixtures thereof.

18. Process of claim 14 wherein conversion of said polymer is at least 95%, measured by thermal gravimetric procedure.

* * * * *